April 28, 1925.  
F. C. SMART  
LATHE CHUCK  
Filed Nov. 18, 1919  
1,535,183  
2 Sheets-Sheet 1
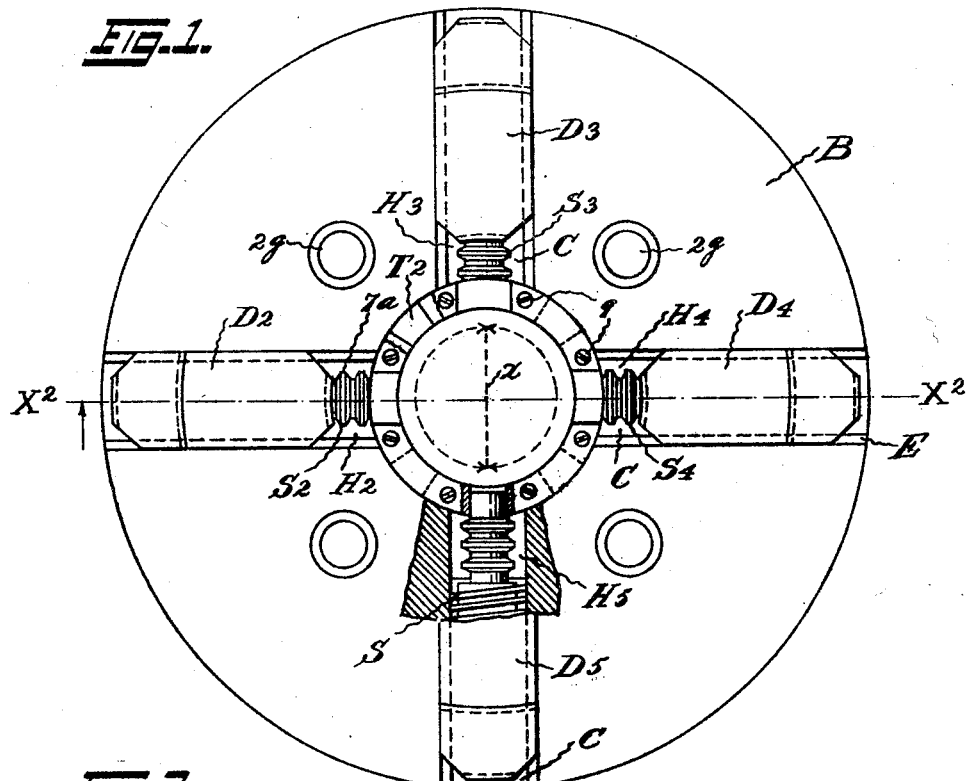
Inventor:  
Frank C. Smart,  
By his Att'y J. H. Richards.

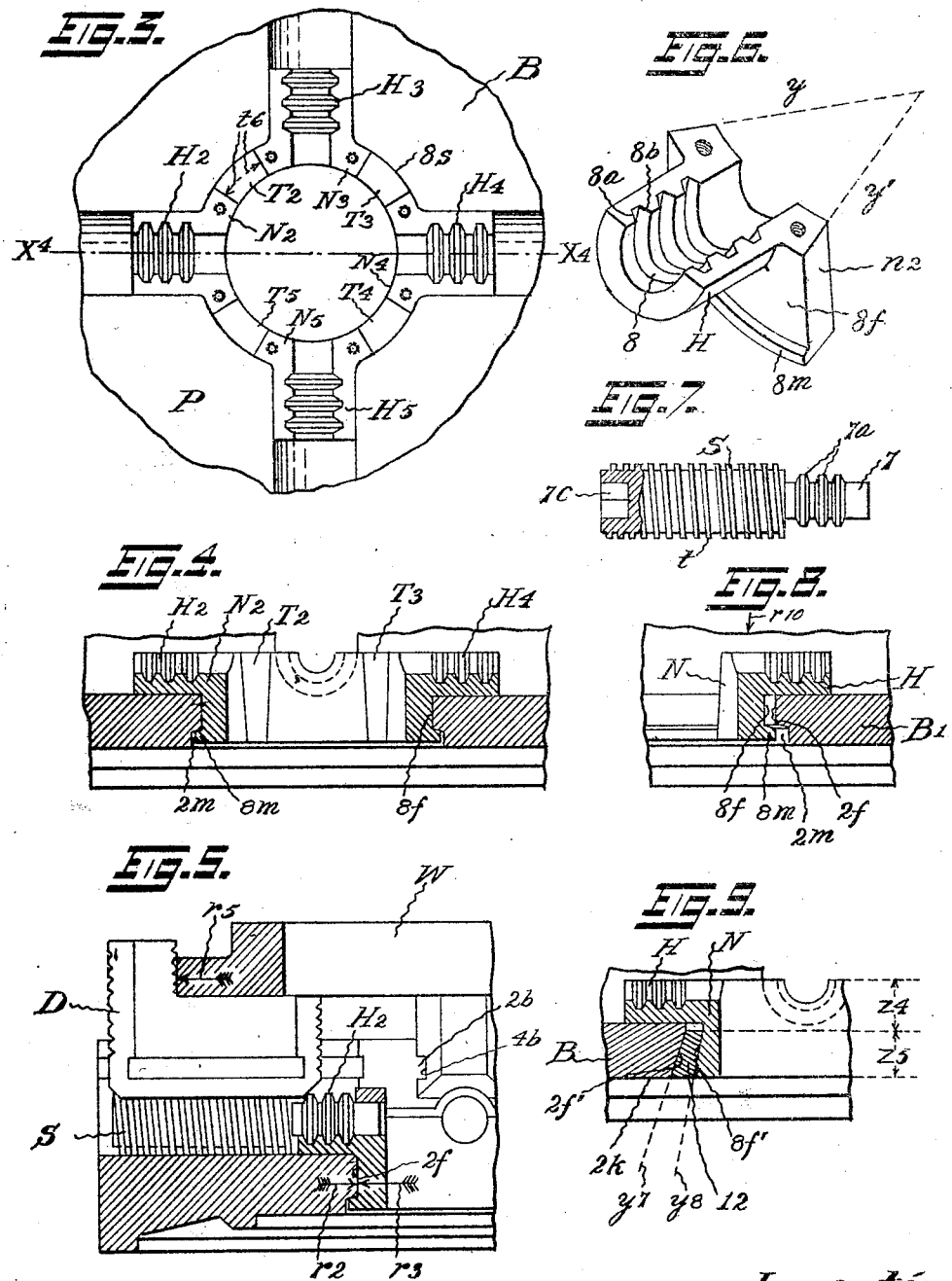

Patented Apr. 28, 1925.

1,535,183

UNITED STATES PATENT OFFICE.

FRANK C. SMART, OF HARTFORD, CONNECTICUT.

LATHE CHUCK.

Application filed November 18, 1919. Serial No. 338,801.

*To all whom it may concern:*

Be it known that I, FRANK C. SMART, a citizen of the United States, residing in Hartford, in the county of Hartford and State of Connecticut, have invented certain new and useful Improvements in Lathe Chucks, of which the following is a specification.

This invention relates to the class of lathe chucks, a form of which is illustrated and described in my Patent No. 1,325,915, issued Dec. 23, 1919, to which reference may be had.

An object of my present invention is to furnish an improved construction and organization of the jaw-operating screws and screws-holding bearings for use in the class of lathe chucks which is provided with a series of radially disposed and slidable work-holding jaws. Chucks of this class are sometimes made with two or with three jaws, these being evenly spaced apart in the circumference of the chuck-body, but more generally the chuck jaws are four in number.

A further object of my present invention is to furnish a chuck in which the body portion of the chuck is provided at an edge thereof with means coactive with means arranged at an edge of ring segments or bearing segments of the bearing-carrier or ring for positively preventing the ring segments or bearing segments from being moved upwardly; in the present instance this object being accomplished by means of a groove formed in an edge of the body portion of the chuck, and a rim formed in an edge of each ring segment or bearing segment which engages with said groove.

Another object is to furnish a chuck provided with means engaging the body portion of the chuck and engaging the ring segments or bearing segments of the bearing carrier or ring for subjecting the bearing carrier or ring to a powerful contractile force or pressure, this object in the present instance being accomplished by means of wedging members which engage the body portion and the ring segments or bearing segments of the bearing carrier or ring.

Further objects are hereinafter stated and explained.

In the particular variety of chuck selected for illustration herein, the jaws are shown of a conventional form and are four in number, and they are preferably radially-disposed in the usual manner illustrated; but, it is to be understood that the term "radially-disposed" and other terms of similar import as used herein, are not to be strictly construed, and that they refer merely to the general or approximate arrangement, and do not require or imply an exactly radial positioning of any part or parts so designated.

In the accompanying drawings forming a part of this specification, Figure 1 is a plan view, (in this special art, also sometimes designated as a "front" view), of a lathe chuck of the class to which my present improvements are especially applicable; in this view, one portion is broken away for more clearly illustrating certain details.

Fig. 2 is a sectional view on the line $X^2$—$X^2$ of Fig. 1, showing the parts above said line as seen from below, but with the jaw $D^2$ and screw $S^2$ shown in side view, and with the screw $S^4$ shown only partially in section.

Figure 3 is a plan view illustrative of the ring-and-bearing system which is of composite construction.

Figure 4 is a sectional view on the line $X^4$—$X^4$ of Fig. 3, showing the parts above said line as seen from below said line.

Figure 5 is a diagrammatic view explanatory of the mode of action of the bearing carrier or ring in relation to the screw-holding bearings; and of the action of the work-holding strains in relation to said ring and bearings.

Figure 6 is a perspective illustration of one of the bearings H shown in plan view in Fig. 3, these bearings there being separately designated by $H^2$, $H^3$, $H^4$ and $H^5$.

Figure 7 is a side view of one of the jaw-operating screws.

Figure 8 is a fragmentary sectional view for illustrating an initial stage of the assembling operation, as hereinafter more fully explained.

Figure 9 illustrates a means for contractively holding the bearing carrier or ring.

Similar characters designate like parts in all of the views.

Referring to the drawings, in Figs. 1, 2, 3, the chuck-body member, B, is shown of a common form, excepting as to certain features in connection with the screw-holding bearings, as hereinafter explained. Said member B has formed therein a series of slots or guide-ways, as C, (Fig. 1), which are or may be radially-disposed, and which are fitted with ribs and grooves coactive with corresponding features of the jaws D, respectively. The guide-ways C are extended downwardly, and are shaped at the bottom thereof, to form the guide-ways E for the jaw-operating screws S, respectively.

In the present instance, the body member B is shown as having only a single pair of ribs, as $2^a$, $2^b$, Fig. 2, which engage in a corresponding pair of grooves, as $4^a$, $4^b$, of the jaw D, so that this jaw is slidable on and guided by the ribs of the body-member in a well-known manner. Thus the jaw D is shown herein as having formed in each side thereof, only a single groove, as $4^a$, or $4^b$, but in some instances,—and according to a common practice,—a plurality of such coacting ribs and grooves (not herein shown) may be provided,—in a well-known manner,—on each side of any one or more of the jaws.

The several chuck-jaws are herein referred to as "jaws D," and individually without choice as "jaw D," but for convenience or reference,—especially in comparing the drawings,—the four jaws D are herein separately indicated by the characters $D^2$, $D^3$, $D^4$, and $D^5$, respectively. Similarly, the four jaw-actuating "screws S," but are separately indicated by the characters $S^2$, $S^3$, $S^4$, and $S^5$, respectively. This notation method is also applied herein to the guide-ways C and E, for the jaw D and screw S, respectively,—also, to the screw-holding bearings H, hereinafter described. The jaws D are herein shown as being duplicates and also of a common reversible form, and as engaging (by a segmental nut integral with the jaw) in a well-known manner with the screw thread, as $t$, of the duplicate screws S, respectively.

The chuck-jaws, D, are usually provided with three or more work-holding faces, but only three such faces are herein shown. Two of these faces, $4^c$, and $4^d$, are shown formed in a usual manner on the ends of the jaw, while a third said face, $4^e$, is located (also in a usual manner) at some convenient or desired position intermediate to said jaw-ends. In the present instance, the shorter end-face $4^c$ is shown located on the inner end of the jaw D, which is nearest the axis of the chuck, while the face $4^e$ is an inwardly facing one. On reversing the chuck-jaw in the customary manner, (not herein shown, those positions of said faces relative to the body B will, of course, be reversed.

Since the class of chucks herein illustrated are especially adapted and intended for use when attached to the spindle of a lathe or analogous machine, it is customary to form on the back of the body member, B, a face, as $2^k$, and a holding rim, as $2^h$, for receiving a flanged hub, which may be of the customary or general form and which, in accordance with a common practice, may be removably fixed to, or may be made integral with such a machine spindle. Hence it is also customary to make through said member B, a series of holes, as $2^g$, (Fig. 1), for a plurality of ordinary hub-holding bolts (not herein shown), by which to removably attach the chuck body to the flanged hub in a well-known manner. Necessarily, said bolt-holes $2^g$ are located in the spaces between the jaws D, as shown in Fig. 1, so that said holes extend through the thickest portions of the castings of which the chuck-bodies, as B, are manufactured, and the utility and economy of my present invention relative to "blow holes" in the body B, incident to providing holes such as $2^g$ in the body B, are the same as set forth in my patent before mentioned.

Having in view the general features of the chuck as already set forth, it will be seen by comparing Figs. 1, 2, and 7, that the thread, $t$, of screw S is continuous and uninterrupted through its length; and, that on their inner ends, the screws S are prolonged in the form of a journal, 7, which is provided with one or more rib-like rings that are in the nature of thrust-bearings or thrust collars. In the present instance, these collars, $7^a$, are shown three in number, and in external diameter they may correspond with but should not be greater than the diameter of the body portion $7^b$ of the screw S, inside of the thread $t$, so that the jaws D may pass over said collars in the usual manner, without interference, as will be evident from Fig. 2. Said journal-ends, 7, are shown fitted to turn in bearings, H, which are fitted into the guide-ways E, respectively, and are located and secured in position at the extreme inner ends of these guide-ways,—see Figs. 1, 2, and 6,—and are therein maintained preferably by the means and in the manner hereinafter more fully explained.

For engaging the screw S with the bearings H each said bearing is shown having formed therein one or more semi-circular thrust-bearing channels or grooves,—as 8,— each having a pair of thrust-faces, as $8^a$, and $8^b$, Fig. 6, (corresponding with said thrust-collars $7^a$). Thus, when the bearings are in place, the screws S may be laid downwardly into their guide-ways E, and thus place the said annular thrust-bearing rings or journals $7^a$, in said semi-annular thrust-bearing channels 8, respectively; next, the jaws D may be slid into their receiving channels C by engaging the usual jaw-guiding ribs, or ways, $2^a$, $2^b$, of the body B in the guide-channels $4^a$, $4^b$, respectively, of the jaws. During this part of the assembling operation, of course, the segmental-nut threads $t^2$, of the jaws will be engaged with the threads $t$ of the screws S, respectively so that by turning a screw S, the coacting jaw may be slid along on its guides to any required position within the normal working range thereof. In Fig. 2, the screw $S^4$ has a portion broken away for showing a usual form of squared hole $7^c$, wherein the ends of a wrench may be inserted, whereby to turn the screw.

Where properly fitted and thus assembled as here explained, the chuck-jaw, as D,—see Figs. 2 and 5,—constitutes a means for holding the coacting screw S down into its seat or guide-way, E, so that said screw will be rotatable between said guide-way and jaw as if within a bearing. This arrangement also operates to normally hold the inner end portion of the journal 7 of the screw S downward into the bearing H, so that said thrust-collars $7^a$ are maintained in proper engagement with said semi-annular thrust faces $8^a$, $8^b$. However, should a jaw D be removed, (as will be required at times in using the chuck), the coacting screw S would be released and might fall out. To prevent such a displacement, and also to assist in retaining screw S in place when the jaw D is drawn out to an extreme position, I have provided the screw-retaining ring P which is in the nature of a bearing cap, and which may be removably secured in place in any convenient manner, as for instance, by a series of small cap-screws, as 9, of suitable number and arrangement.

The several screw-engaging bearings, as $H^2$, $H^3$, $H^4$, and $H^5$, are herein shown in Fig. 2, as being each integrally joined to the immediately adjacent (the contiguous) portion of the bearing-carrier, or ring, N. Thus each of the "bearings H" may be said, when considered as an entirety, to comprise a bearing proper, as H, which is fitted to lie down firmly in said guide-way E for the screw S, and also to comprise an anchor bearing, which, (in said construction of Fig. 6), consists of a segmental portion of the ring N, as, for instance, the portion between the dotted lines $y$, $y'$, (Fig. 6), and there designated by $n^2$. The proper tensioning or tensely-fixing in place of the bearing H may be accomplished in practice as indicated in Figs. 2 and 8, where a section of the ring N and of a bearing H, is shown in position for beginning the forcing-in operation, this being indicated by the arrow $r^{10}$; in said Fig. 8, of course, the differences of diameter of the surfaces $8^f$ and $2^f$ are indicated as being very much enlarged in order to secure clearness of illustration; in practice, in the manufacture of any particular size of chuck, the proper amount of said difference in the diameter of the faces $2^f$ and $8^f$, are readily ascertained by trial.

One object accomplished by the system or organization herein set forth, is the subjection of the screw-holding bearings to an initial positioning stress or tensioning with relation to the chuck-body and relative to each other, prior to the application thereto of any work-holding strain. Accordingly, when such a strain is applied, as indicated in Fig. 5, by the arrow $r^5$, the force so exerted by the "work", as W, against the jaw D is transmitted through the screw S and thence through the pair (or pairs) of engaging and coacting screw and bearing faces, to the anchor-bearing, H, with the result of applying to this bearing an outwardly acting force in the direction of the arrow $r^3$, this direction being the same as that of the said previously-produced initial tension. Thus, on the work-holding strain being gradually applied,—as necessarily occurs in practice, by the operator turning the jaw-actuating screw S,—the force thereof is increasingly transmitted through the described faces and is finally resisted by the face $2^f$ in the direction of the arrow $r^2$; hence, as will now be evident, the newly applied work-holding strain will be supported by the pressure of abutting faces which were already under the pressure of forces acting in the same direction.

In Figs. 1 and 3, the composite and continuous construction of the carrier member is shown. In these views, the bearings $H^2$, $H^3$, $H^4$, $H^5$, are shown as each integrally joining with a segmental member, as $N^2$, $N^3$, $N^4$, $N^5$, respectively, each forming one portion of the complete but composite carrier ring. Thus each said bearing corresponds with the bearing and ring-segment shown in Fig. 6 and consists of the bearing proper, as H, and an anchorage flange,—here designated as a ring-segment,—having an outer face, $8^f$, for engaging within the aforesaid inner face of the body portion of the chuck, forming the compression hoop within which said carrier is held under a contractile stress. When the bearings H, are four in number, the arcual length of the bearing-flange or segment, as $N^2$, (Fig. 3), may be made considerably less than ninety degrees, and thereby provide for a series of tensioning, or straining-up members, as $T^2$, $T^3$, $T^4$, $T^5$, which, as clearly indicated in the drawing, (Fig. 4), may be of a slightly tapering form, so as to act as wedges when forced firmly into place between said bearing members. The wedge members or straining-up members $T^2$, $T^3$, $T^4$ and $T^5$ when properly forced between adjacent ring segments $N^2$, exert a pressure or force upon the portions of the ring segments with which such members abut, as indicated by the arrow $t^6$, Fig. 3, and as will readily be understood.

This system of assemblage,—Figs. 3, 4,—provides for a further improvement. In Fig. 8, an annular recess, $2^m$, is formed in the body zone B', at the lower edge of the face $2^f$, and the lower edge of each of the ring-segments, as N², etc., is provided with a rim 8ᵐ which locks into said recess, thereby positively preventing the bearing segment from being moved upwardly. In assembling this form of the chuck, the several bearings H, are dropped into place in their seats, E, and are then slid outwardly until their ring segments bear against the body face 2ᶠ, while the rims, 8ᵐ, are engaged in said recess 2ᵐ; these groove-faces, or segment-faces, whereby the members engage for locating them, are shown as being in planes which are transverse to the axis of the chuck. Next, the wedge members, T, are forcibly pushed down between said ring-segments, for thereby locking the several parts into a firmly fixed assemblage, and subjecting the entire ring,—by such expansion thereof,—to a powerful contractile force within the body-zone, or "hoop," B'.

In this construction it will be seen that the views 2, 4, 5, 6 and 8 differ from the specific forms shown in said original patent merely by the omission of an immaterial shoulder at the junction of the ring N and the bearing segment H. The groove shown in said patent along the upper edge of the clutch body B (at the upper edge of the face 2ᶠ) is also herein omitted, it being immaterial to the subject matter hereof.

In the modified form which is illustrated in Fig. 9, the bearings H are integrally connected with the carrier ring N, in the same manner as already described in my above mentioned patent but a different means is provided for subjecting the bearing carrier ring to contractile pressure within the face 2ᶠ' of the body B.

The said inner face of the body member is formed slightly conical, as 2ᶠ', the larger diameter being adjacent to the face 2ᵏ of said member. Also, the outer face of the ring N, which ring is integral throughout the entire circuit, is of a conical form, 8ᶠ', the direction of the inclination, as seen in a sectional view being in the same direction as said face 2ᶠ', but, preferably, slightly divergent therefrom, as indicated for instance by the dotted line $y^7$, $y^8$. The ring N being inserted in the central opening of the body member B, with the bearings H properly located in their respective seats, E, then a wedge ring, 12, is inserted between said faces 2ᶠ' and 8ᶠ', and is then pushed into place for thereby locking, as by a key, said bearing-carrier firmly in place within the member B, said keying-in ring being in effect a portion of the body-member B. In practice, and in order not to require an upsetting (circumferentially thereof), of said keying-in ring 12, this keying ring may be divided at one or more points (not shown), so as to facilitate the necessary contraction in diameter while being forced into place.

In the arrangement here described, and by suitably proportioning the several parts, that portion of the ring N which lies in the lower zone $z^5$, may be forcibly compressed in diameter for thereby securing the desired tensity in the positioning of the bearings H. At the same time said keying-in member 12 operates,—in an evident manner,—to very securely and rigidly lock the member N and bearings H accurately in position.

From the foregoing description it will now be evident how the surface of the semi-cylindrical, or partly-cylindrical guide-way E, is used in part as a bearing-surface for the screw S and also in part as a supporting seat, face, or surface for receiving thereon the semi-annular, or partly-annular, bearing H. Also, how the same guide-surface E of a body B, may be used to support bearings H having different lengths, respectively. For use in a chuck-body of some given size and proportion, in one instance, a ring N having short bearings H may be secured in the central position, and in another instance, a ring N having much longer bearings H, may be secured in said position. Thus, one and the same portion (adjacent to bearing H) of the same face of a guide-way E,—this face being continuous, uniform and unbroken, may in one instance constitute in part the bearing-surface for a screw S, and in another instance constitute a supporting face for a thrust-bearing H.

Having thus described my invention, I claim:

1. In a chuck, in combination, a body-member; a series of thrust bearings; jaw-actuating screws operative in said body-member provided with means for engaging said thrust bearings; work-engaging jaws located in said body-member and actuatable by said screws; and wedging means for exerting axial pressure on said thrust bearings.

2. In a chuck, in combination, a body-member; segments provided with thrust bearings; jaw actuating screws operative in said body-member provided with means for engaging said thrust bearings; work-engaging jaws located in said body-member and actuatable by said screws; and wedging means for exerting axial pressure on said thrust bearings.

3. In a chuck, in combination, a body-member; ring segments, each segment being provided with thrust bearings; jaw-actuating screws operative in said body-member provided with means for engaging said thrust-bearings; work engaging jaws located in the body-member and actuatable by said screws; and wedging means for exerting axial pressure on said thrust bearings.

4. In a chuck, in combination, a body-member having a mid-space opening and having guide-ways extending outwardly from said opening; ring segments arranged adjacent to said guide-ways, each segment being provided with thrust-bearings; jaw-actuating screws operative in said guide-ways and provided with means for engaging said thrust-bearings; work-engaging jaws located in said opening and actuatable by said screws; and wedging means for exerting axial pressure on said thrust bearings.

5. In a chuck, in combination, a body-member having a mid-space opening and having guide-ways extending radially outward from said opening; ring segments arranged between said guide-ways, each segment being provided with thrust bearings; jaw-actuating screws operative in said guide-ways and provided with means for engaging said thrust bearings; work-engaging jaws located in said opening and actuatable by said screws; and wedges between the ring segments for exerting axial pressure on said thrust bearings.

6. In a chuck, in combination, a body-member; a series of thrust bearings; jaw-actuating screws operative in said body-member provided with means for engaging said thrust bearings; work-engaging jaws located in said body-member and actuatable by said screws; wedging means for exerting axial pressure on said thrust bearings; and means for preventing movement of the thrust bearings axially of the body-member.

7. In a chuck, in combination, a body-member; a series of thrust bearings; jaw-actuating screws operative in said body-member provided with means for engaging said thrust bearings; work-engaging jaws located in said body-member and actuatable by said screws; wedging means for exerting axial pressure on said thrust bearings; and means coactive between the thrust bearings and the body-member for preventing movement of the thrust bearings axially of the body-member.

8. In a chuck, in combination, a body-member; segments, each segment being provided with thrust bearings; jaw-actuating screws operative in said body-member provided with means for engaging said thrust bearings; work-engaging jaws located in said body-member and actuatable by said screws; and wedging means coactive between the segments for exerting axial pressure on said thrust bearings; said segments being provided with means for engaging the body-member for preventing movement of the segments axially of the body-member.

9. In a chuck, in combination, a body-member; ring segments, each segment being provided with thrust bearings; jaw-actuating screws in said body-member and provided with means for engaging said thrust bearings; work-engaging jaws located in the body-member and actuatable by said screws; and wedges between the ring segments for exerting axial pressure on said thrust bearings; said ring segments being provided with means for engaging the body-member for preventing movement of the ring segments axially of the body-member.

10. In a chuck, in combination, a body-member having a mid-space opening and having guide-ways extending outwardly from said opening; ring segments arranged between said guide-ways, each ring segment being provided with thrust bearings; jaw-actuating screws operative in said guide-ways and provided with means for engaging said thrust bearings; work-engaging jaws located in said opening and actuatable by said screws; and wedges between the ring segments for exerting axial pressure on said thrust bearings; said ring segments being provided with means on the ring segments for engaging means on the body-member for preventing movement of the ring segments axially of the body-member.

11. In a chuck, in combination, a body-member; a series of annular grooved thrust bearings; jaw-actuating screws operative in said body-member and provided with annular collars for engaging said thrust bearings; work-engaging jaws located in said body-member and actuatable by said screws; and wedging means for exerting axial pressure on said thrust bearings.

12. In a chuck, in combination, a body-member; segments, each segment being provided with annular grooved thrust bearings; jaw-actuating screws operative in said body-member and provided with annular collars for engaging said thrust bearings; work-engaging jaws located in said body-member and actuatable by said screws; and wedging means for exerting axial pressure on said thrust bearings.

13. In a chuck, in combination, a body-member; ring segments, each segment being provided with annular grooved thrust bearings; jaw-actuating screws operative in said body-member and provided with annular collars for engaging said thrust bearings; work-engaging jaws located in said body-member and actuatable by said screws; and wedges between the ring segments for exerting axial pressure on said thrust bearings.

14. In a chuck, in combination, a body-member; a series of annular grooved thrust bearings; jaw-actuating screws operative in said body-member provided with annular collars for engaging said thrust bearings; work-engaging jaws located in said body-member and actuatable by said screws; wedging means coactive between said thrust bearings for exerting axial pressure on said thrust bearings; and means for preventing movement of the thrust bearings axially of the body-member.

15. In a chuck, in combination, a body-member; segments, each segment being provided with annular grooved thrust bearings; jaw-actuating screws operative in said body-member and provided with annular collars for engaging said thrust bearings; work-engaging jaws located in said body-member and actuatable by said screws; wedging means coactive between said segments for exerting axial pressure on said thrust bearings; and means for preventing movement of the segments axially of the body-member.

16. In a chuck, in combination, a body-member; ring segments, each ring segment being provided with annular grooved thrust bearings; jaw-actuating screws operative in said body-member and provided with annular collars for engaging said thrust bearings; work-engaging jaws located in said body-member and actuatable by said screws; and wedges between the ring segments for exerting axial pressure on said thrust bearings; said ring segments being provided with a rim for engaging a groove in the body-member for preventing movement of the ring segments axially of the body-member.

17. In a chuck, in combination, a body-member having a mid-space opening and having guide-ways extending outwardly from said opening; ring segments arranged between said guide-ways, each ring segment being provided with annular grooved thrust bearings; jaw-actuating screws operative in said guide-ways and provided with annular collars for engaging said thrust bearings; work-engaging jaws located in said opening and actuatable by said screws; and wedges between said ring segments for exerting axial pressure on said thrust bearings; said ring segments being provided with a rim for engaging a groove in the body-member for preventing movement of the ring segments axially of the body-member.

18. In a chuck, in combination, a body-member having a mid-space opening and having guide-ways extending outwardly from said opening; ring segments arranged between said guide-ways, each ring segment being provided with annular grooved thrust bearings; jaw-actuating screws operative in said guide-ways and provided with annular collars for engaging said thrust bearings; work-engaging jaws located in said opening and actuatable by said screws; and wedges between said ring segments for exerting axial pressure on said thrust bearings; said ring segments being composed of a thrust bearing portion and an anchorage portion for engaging the body-member, and the anchorage portion being provided with a rim for engaging a groove in the body-member.

19. In a chuck, in combination, a body-member having a mid-space opening and having guide-ways extending outwardly from said opening; ring segments arranged between said guide-ways, each ring segment being provided with annular grooved thrust bearings and a journal bearing; jaw-actuating screws operative in said guide-ways, each screw being provided with annular collars for engaging said thrust bearings and a journal for engaging said journal bearing; means for retaining the journals of the jaw-actuating screws in engagement with the journal bearings of the ring segments; work-engaging jaws located in said opening and actuatable by said screws; and wedges between said ring segments for exerting axial pressure on said thrust bearings; said ring segments being composed of a thrust bearing portion and an anchorage portion for engaging the body-member, and the anchorage portion being provided with a rim for engaging a groove in the body-member.

20. In a chuck, in combination, a body-member having a mid-space opening and having guide-ways extending radially outward from said opening; ring segments arranged between said guide-ways, each ring segment being provided with annular grooved thrust bearings and a journal bearing; jaw-actuating screws operative in said guide-ways, each screw being provided with annular collars for engaging said thrust bearings and a journal for engaging said journal bearing; means for releasably retaining the journals of the jaw-actuating screws in engagement with the journal bearings of the ring-segments; wedges between said ring segments for exerting axial pressure on said thrust bearings; and means for actuating the jaw-engaging screws to actuate the work-engaging jaws; said ring segments being composed of a thrust bearing portion and an anchorage portion for engaging the body-member, and the anchorage portion being provided with a rim for engaging a groove in the body-member.

21. As an article of manufacture, the herein described chuck-screw bearing consisting of a ring segment having segment-faces in planes transverse to the axis of a lathe chuck for engagement with the body portion of a lathe chuck, the ring segment having wedge faces positioned for engaging similar ring segments and forming with said segments a continuous ring for reception in the axial bore of a lathe chuck, and being provided with an anchorage portion for engaging the body of a lathe chuck having means for preventing movement of the ring segment axially of the bore of the chuck when so engaged.

FRANK C. SMART.

Witnesses:
MARGARET H. R. DAVIDSON,
ANNA PICKEL.